(12) United States Patent
Bradley (10) Patent No.: US 7,587,859 B2
(45) Date of Patent: Sep. 15, 2009

(54) CAPILLARY HYDRATION SYSTEM AND METHOD

(75) Inventor: Treg C Bradley, Phoenix, AZ (US)

(73) Assignee: Grobal, LLC, Chandler, AZ (US)

( * ) Notice: Subject to any disclaimer, the term of this patent is extended or adjusted under 35 U.S.C. 154(b) by 527 days.

(21) Appl. No.: 11/419,103

(22) Filed: May 18, 2006

(65) Prior Publication Data
US 2007/0266629 A1 Nov. 22, 2007

(51) Int. Cl.
A01G 31/02 (2006.01)
(52) U.S. Cl. .................. 47/62 R; 47/62 N; 47/60
(58) Field of Classification Search .......... 47/59 R, 47/60, 60 R, 62 A, 62 N, 61, 65, 66.6, 81, 47/69, 29.2, 29.1, 63, 84, 79, 39; D11/143, D11/144, 145; 206/423
See application file for complete search history.

(56) References Cited

U.S. PATENT DOCUMENTS

| | | | |
|---|---|---|---|
| 2,138,188 | A | 11/1938 | Morley |
| RE21,820 | E | 6/1941 | Munsell |
| 2,361,029 | A | 10/1944 | Heinl |
| 3,018,586 | A | 1/1962 | Farley |
| 3,660,933 | A | 5/1972 | Wong, Jr. |
| 3,995,396 | A | 12/1976 | Spector |
| 4,055,991 | A * | 11/1977 | Bridwell ............ 73/73 |
| 4,057,930 | A | 11/1977 | Barham |
| 4,135,331 | A * | 1/1979 | Lamlee ............ 47/61 |
| 4,166,341 | A * | 9/1979 | Vestergaard ........ 47/59 R |
| D254,127 | S | 2/1980 | Sgroi |
| 4,198,783 | A | 4/1980 | Leroux |
| D256,110 | S | 7/1980 | Dunbar et al. |
| 4,299,054 | A * | 11/1981 | Ware ............ 47/64 |
| D271,035 | S | 10/1983 | Pomerenke |

(Continued)

FOREIGN PATENT DOCUMENTS

CH 479237 10/1969

(Continued)

OTHER PUBLICATIONS

E-mail message from Elson Silva, Ph.D., subject "Requesting IDS of US 6,766,817 for patents of fluids moving on porosity by Unsaturated Hydraulic Flow," dated May 20, 2008, 4 pages.

(Continued)

Primary Examiner—T. Nguyen
(74) Attorney, Agent, or Firm—Snell & Wilmer L.L.P.

(57) ABSTRACT

A capillary hydration system and method for facilitating the growth of plants are provided. An exemplary system comprises a base having a reservoir for holding nutrient solution, and an insert portion. The insert portion comprises at least one downwardly extending plant receiving depression that is capable of holding growth substrate. The plant receiving depression has at least one capillary opening such that when the capillary opening is in liquid communication with the nutrient solution in the reservoir, nutrient solution is wicked from the reservoir to the growth substrate by capillary action. In accordance with various exemplary embodiments, the capillary hydration system may further comprise cover, including a cover with a hatch for refilling the nutrient solution without removing the insert portion or the cover, and a nutrient supply level indicator.

18 Claims, 6 Drawing Sheets

U.S. PATENT DOCUMENTS

| | | | |
|---|---|---|---|
| D300,911 S | 5/1989 | Allen | |
| D304,913 S | 12/1989 | Cassells et al. | |
| 4,976,064 A | 12/1990 | Julien | |
| 5,282,335 A | 2/1994 | Holtkamp | |
| D356,523 S | 3/1995 | Rahr | |
| 5,394,647 A | 3/1995 | Blackford, Jr. | |
| D388,464 S | 12/1997 | Najbart | |
| D465,733 S | 11/2002 | Hill | |
| 6,527,411 B1 | 3/2003 | Sayers | |
| D478,813 S | 8/2003 | Beene | |
| 6,766,817 B2 | 7/2004 | Silva | |
| 6,918,207 B2 | 7/2005 | Dai | |
| 6,918,404 B2 | 7/2005 | Dias da Silva | |
| 7,066,586 B2 | 6/2006 | da Silva | |
| D531,930 S | 11/2006 | Cabre Roige | |
| D537,753 S | 3/2007 | Belokin | |
| D543,244 S | 5/2007 | Tsuruha | |
| D553,687 S | 10/2007 | Huang | |
| 2004/0031194 A1 | 2/2004 | Trabka | |
| 2004/0177553 A1* | 9/2004 | Harbaugh | 47/65.6 |
| 2005/0241231 A1 | 11/2005 | Bissonnette et al. | |
| 2005/0246955 A1 | 11/2005 | Bissonnette et al. | |

FOREIGN PATENT DOCUMENTS

| | | |
|---|---|---|
| EP | 0788734 | 8/1997 |
| WO | WO 99/35899 | 7/1999 |

OTHER PUBLICATIONS

IPRP in International Application No. PCT/US2007/069226, dated Apr. 6, 2008.

E-mail message from Elson Silva, Ph.D., on the subject of "Understanding Hydrology in the Patenting System," dated Nov. 13, 2008, 8 pages.

* cited by examiner

CAPILLARY HYDRATION SYSTEM AND METHOD

FIELD OF THE INVENTION

The invention relates to devices for growing plants, and more particularly to a capillary hydration system and method for use in hydroponics and other plant growing applications.

BACKGROUND OF THE INVENTION

In the field of growing plants, one common method used is known as hydroponics (or the soil-less growth of plants), that comprises the cultivation of plants by placing the roots in a nutrient solution rather than in soil. In some instances a light soil or similar material (e.g. peat moss or even some man made materials) may be used to hold the roots, but the primary nutrients are provided by solutions that are either added or in which the roots actually reside.

One major concern with this method of growing plants is the amount of area and equipment that is required. In most instances, a completely separate building is required with light and temperature control as well as containers for holding the plants and the nutrient solutions. This can be costly for start-up companies and can severely limit the people who can participate, since most of this type of growing will take place in cities or highly populated areas where there is insufficient area for standard farming techniques and, thus, limited area for the installation of normal hydroponics-type growing.

While a large variety of hydroponics systems and methods of use are available or have been proposed, most of these systems have serious limitations, such as the liquid circulation apparatus or limitations on the vertical or horizontal expansion of the systems. One reference, for example, proposes a modular structure in which a lower module contains the liquid and a pump. One disadvantage of these structures is that as the modules are stacked higher, the pump must displace liquid farther, and thus the distribution of the liquid is very haphazard. In another example, a base contains the liquid supply and one or more columns extend vertically from the base. Liquid is pumped from the base through tubes to the top of the columns (one tube per column) and the liquid flows down across the roots of plants, residing in openings in the columns, and back into the base. In this example, the vertical height is limited to the height of the column and extra height cannot be added without completely changing the column.

Another problem that arises in many of the existing hydroponics devices is proper lighting. In many of the existing plant growth units, different types and amounts of light may be received by the plants in different positions. The differences in light quality and quantity may result in a divergence in growth and quality between plants grown at various levels and on various sides of the plant growth units.

In many instances, people would like to grow only a few plants and would like to place them in convenient locations. For example, in many instances people like several plants standing around their living area or, if weather permits, outside on a patio or veranda. In this day, many people are too busy to provide proper care for the plants and, consequently, they find maintaining the plants very difficult.

SUMMARY OF THE INVENTION

While the way that the present invention overcomes the disadvantages of the known art will be discussed in greater detail below, briefly, the present invention provides an inexpensive, convenient system and method for growing plants using capillary-like action. In accordance with various aspects of the present invention, a capillary hydration system and method for use in hydroponics and other plant growing applications are provided.

In accordance with an exemplary embodiment, a capillary hydration system is provided that generally comprises a base and an insert portion. The base may comprise a reservoir for holding liquid nutrient and, optionally, a stand to support the capillary hydration system in an upright position. The insert portion comprises a horizontal support piece having at least one downwardly extending plant receiving depression capable of being in liquid communication with nutrient solution contained in the reservoir. The plant receiving depression is capable of holding plant growth substrate and has capillary openings in its surface such that when the capillary openings are in liquid communication with the nutrient solution in the reservoir, nutrient solution is wicked from the reservoir to the growth substrate by capillary action.

In accordance with an exemplary embodiment, a reservoir is filled to a convenient level of nutrient solution such that it will not overflow. The insert portion is removably inserted into the base, such that the capillary openings of the plant receiving depressions are in liquid communication with the nutrient solution in the reservoir. The plant receiving depressions are filled with plant growth substrate and a seed or root clippings. The cover is then removably attached to the base. Over time, nutrient solution is wicked up through the capillary openings and through the plant growth substrate to the plant. In another exemplary embodiment, the roots of the plant may grow through the capillary openings to be in direct liquid communication with the nutrient solution.

In accordance with another aspect of the present invention, the capillary hydration system and method are configured to protect or control the impact of the external environment. For example, in accordance with an exemplary embodiment, the capillary hydration unit may further comprise a substantially hemispherical cover that is removably attachable to the base. The cover may be tinted various colors or may be opaque, and may have a hole or other opening approximate its apex to control the amount of light and air that reaches the interior of the capillary hydration unit and protect the plant growing inside the unit from the environment. In various exemplary embodiments, different colored covers may be used at different stages in the plant's development to allow more or less light as needed. In accordance with yet another exemplary embodiment, the capillary hydration unit may further comprise a lighting mechanism to provide an additional source of light to the unit.

In accordance with another aspect of the present invention, a capillary hydration system and method may be configured for allowing the addition of nutrients. For example, in accordance with another exemplary embodiment, the capillary hydration unit may further comprise a nutrient supply hatch to allow nutrients and/or other materials to be deposited into the reservoir without removing the cover and insert portion. In accordance with another exemplary embodiment, the capillary hydration unit may further comprise a nutrient supply level indicator to determine the amount of nutrient solution in the reservoir without removing the insert portion and disrupting the growth substrate.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION

The description that follows is not intended to limit the scope, applicability, or configuration of the invention in any way; rather, it is intended to provide a convenient illustration for implementing various embodiments of the invention. As will become apparent, various changes may be made in the function and arrangement of the elements described in these embodiments without departing from the scope of the invention. It should be appreciated that the description herein may be adapted to be employed having different shaped bases, covers, and insert portions and the like and still fall within the scope of the present invention. Thus, the detailed description herein is presented for the purpose of illustration only and not of limitation.

That being said, in accordance with various aspects of the present invention, a capillary hydration system and method for use in hydroponics and other plant growing applications is provided. Generally, a capillary hydration system or unit is any system, unit or device capable of growing plants using capillary action. In accordance with an exemplary embodiment, a capillary hydration unit comprises a base and an insert portion.

Figure 1:
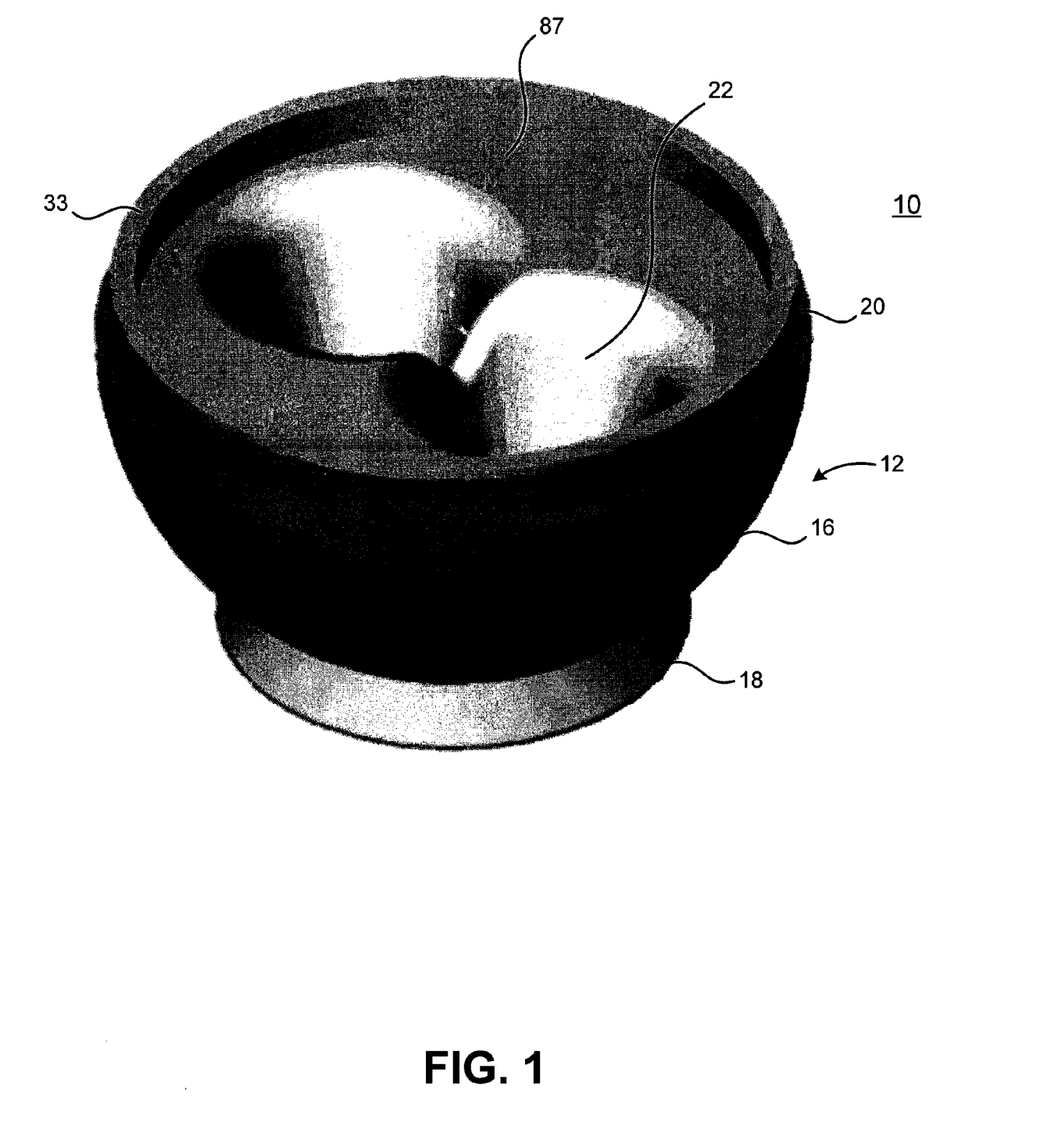
FIG. 1 is perspective view of an exemplary capillary hydration unit having a base and insert portion in accordance with an exemplary embodiment of the present invention.

For example with reference to FIG. 1, an exemplary embodiment of a capillary hydration unit 10 comprises a base 12 and an insert portion 20. Base 12 may be any structure that is capable of holding water and/or primary nutrient solutions (hereinafter "nutrient solution") and stabilizing capillary hydration unit 10 in an upright position. In one exemplary embodiment, base 12 is substantially hemispherical. However, base 12 may be any shape that suitable for maintaining or otherwise stabilizing the unit 10 in an upright position and capable of holding water and/or nutrient solutions. Base 12 may also comprise various plastics, alloys, or any other like materials capable of holding water and/or nutrient solutions.

In accordance with an exemplary embodiment, base 12 comprises a reservoir 16 and a stand 18. Reservoir 16 may be any structure capable of holding water and/or nutrient solution. For example, reservoir may comprise a substantially hemispherical container or opening, but may also comprise rectangular, triangular or any other configuration for holding water and/or nutrient solution. In an exemplary embodiment, reservoir 16 may be filled to any convenient level of nutrient solution such that it will not overflow when an insert portion 20 is positioned therein.

Figure 7:
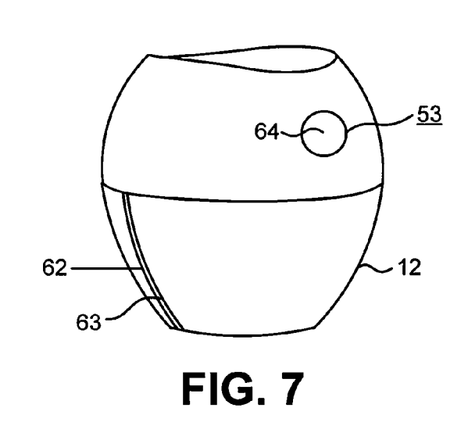
FIG. 7 is a perspective view of an exemplary embodiment of the present invention including a nutrient supply hatch and a water level indicator.

Stand 18 may be any structure capable of stabilizing capillary hydration unit 10 in an upright position. In one exemplary embodiment, stand 18 is triangular. However, stand 18 may be any shape that is capable of supporting or otherwise stabilizing unit 10 in an upright position. As shown in the exemplary embodiments in FIGS. 7-9, stand 18 may be omitted and base 12 may have a flattened bottom portion 19 which stabilizes capillary hydration unit 10 in an upright position. Accordingly, base 12 may be configured in various manners for providing stability to capillary hydration unit 10.

As shown in FIG. 1, in accordance with an exemplary embodiment, upper edge 33 of base 12 may be stepped radially inward around its periphery to facilitate attachment of a cover (not shown). In some exemplary embodiments, upper edge 33 may be ribbed to facilitate a cover being snapped, and/or threaded to facilitate a cover being screwed onto base 12. In other exemplary embodiments, upper edge 33 may comprise a uniform outer surface without such stepping, ribbing or threading, configured for use with or without a cover.

In an exemplary embodiment, base 12 may further comprise a drainage port. A drainage port is any structure which allows water and/or nutrient solution to be drained from the reservoir 16 without removing insert portion 20. Preferably, the drainage port comprises a hole located in base 12 and a plug or stopper piece or other like device that is removably insertable in the hole and is substantially watertight. When the plug/stopper piece is removed, water and/or nutrient solution in reservoir 16 may drain out of capillary hydration unit 10. It will be appreciated by one skilled in the art that the drainage port may be any size or shape, and may be in any location suitable to allow drainage of water and/or nutrient solution from base 12.

As shown in FIG. 1, capillary hydration unit 10 may further comprise an insert portion 20. Insert portion 20 is any structure that capable of supporting the plant growth substrate and allowing nutrient solution to be wicked up to the plant roots via capillary action.

Figure 2:
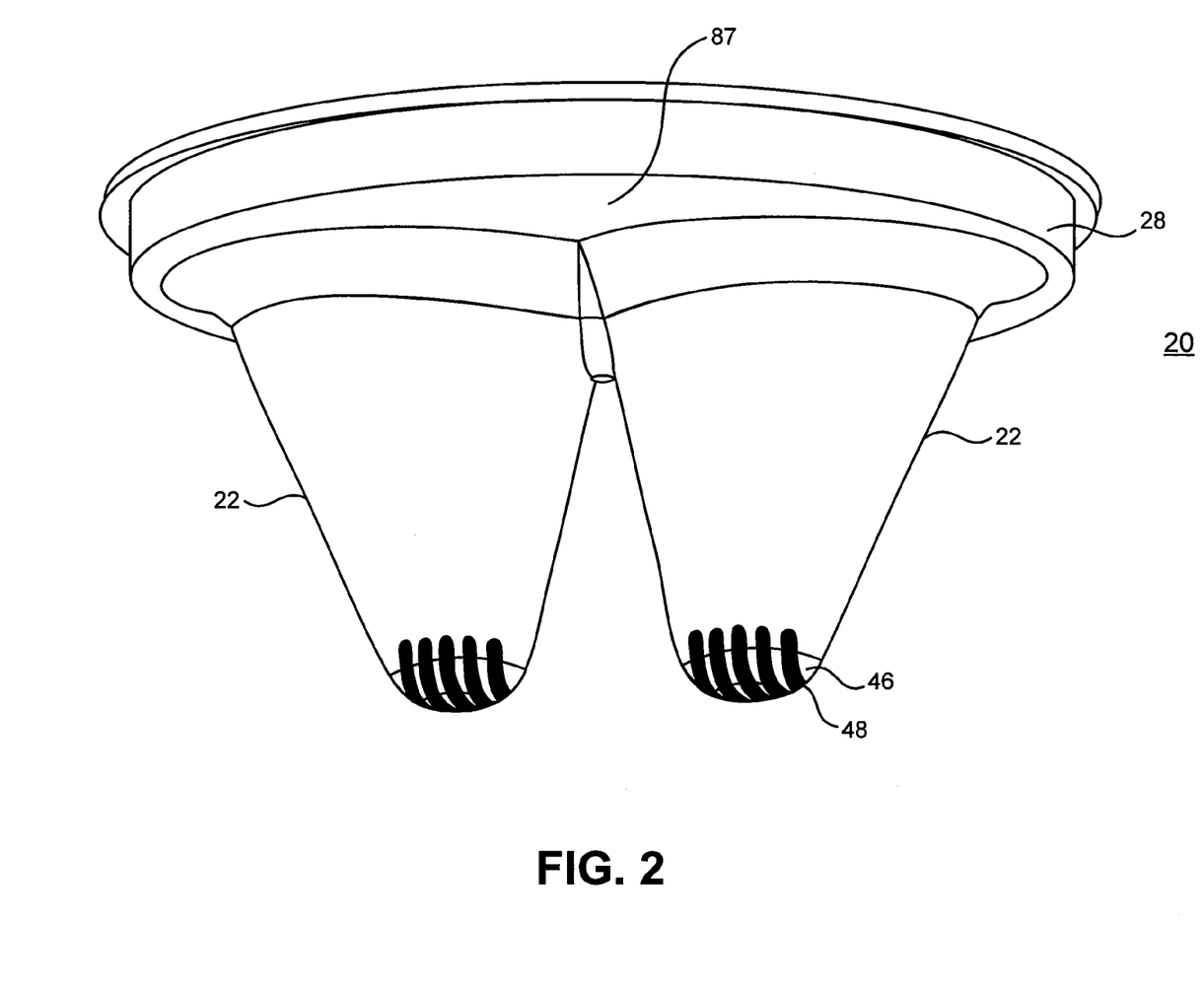
FIG. 2 is perspective view of an exemplary insert portion in accordance with an exemplary embodiment of the present invention.

For example, with reference to an exemplary embodiment illustrated in FIG. 2, insert portion 20 comprises a horizontal support piece 87 having one or more plant receiving depressions 22. The plant receiving depressions 22 support the plant growth substrate above reservoir 16 (not shown in FIG. 2). In accordance with an exemplary embodiment, plant receiving depressions 22 are substantially conical in shape; however, plant receiving depressions 22 may comprise any structure capable of holding plant growth substrate and facilitating capillary action of water and/or nutrient solution to a plant.

The plant growth substrate used in the exemplary capillary hydration units may be any material or composite that is capable of supporting plant roots and which permits nutrient solution to be wicked to the plant roots by capillary action. In one exemplary embodiment, the plant growth substrate is a light soil. However, it will be appreciated by one skilled in the art that any material capable of holding roots and wicking nutrient solution that is known or hereinafter devised, such as peat moss and the like, may be used.

In one exemplary embodiment, plant receiving depressions 22 extend vertically downward so as to be capable of being in liquid communication with water and/or nutrient solution in reservoir 16. In the exemplary embodiment illustrated in FIG. 2, plant receiving depressions 22 are conical and have a truncated or rounded bottom 46. However, it will be appreciated by one skilled in the art that plant receiving depressions 22 may be any desired shape, such as cylindrical, rectangular, triangular or other like-configuration capable of being in liquid communication with water and/or nutrient solution in reservoir 16.

In accordance with an exemplary embodiment, insert portion 20 has three plant receiving depressions 22 so as to create a "tripod" whereby insert portion 20 may stand on its own when removed from base 12, for example, when reservoir 16 is being cleaned or filled with liquid nutrient. However, insert portion 20 may comprise one, two, four or any desired number of plant receiving depressions 22.

In accordance with an exemplary embodiment, plant receiving depressions 22 further comprise a plurality of capillary openings 48. Capillary openings 48 are any openings that allow the limited or otherwise controlled passage of water and/or nutrient solution by capillary action from reservoir 16 to the growth substrate contained in plant receiving depressions 22. In one exemplary embodiment, capillary openings 48 comprise slim openings or fine slits. In another exemplary embodiment, capillary openings 48 may be suitably large such that rounded bottom 46 of plant receiving depression 22 is substantially open, allowing for greater passage of water and/or nutrient solution by capillary action. As such, capillary openings 48 may be any desired configuration, size or shape suitable to permit the passage of liquids and/or liquid nutrient.

In an exemplary embodiment, capillary openings 48 are located on the rounded bottom 46 of the plant receiving depression 22 so as to allow maximum liquid communication with the nutrient contained in reservoir 16. However, capillary openings 48 may be located anywhere along the length of plant receiving depression 22 that is capable of being in liquid communication with water and/or nutrient solution contained in reservoir 16. In one exemplary embodiment, the plant roots grow out through capillary openings 48, such that the roots are in direct liquid communication with the nutrient solution.

In an exemplary, non-limiting embodiment, insert portion 20 is removably mated with base 12 so as to extend substantially horizontally across base 12. For example, in one exemplary embodiment, the outer edge of insert portion 20 includes a flange that fits snugly onto the rim of base 12. In another exemplary embodiment, insert portion 20 comprises a lip around its periphery that removably attaches over the upper edge of base 12. However, any method of attaching, mating or otherwise coupling insert portion 20 to base 12 that is known or hereinafter devised may be used. In another exemplary embodiment, base 12 and insert portion 20 may be fabricated so as to be one piece. In such an exemplary embodiment, insert portion 20 may also comprise a hole or other opening suitably configured to allow the liquid nutrient in reservoir 16 to be refilled without removing the insert portion 20. For example, in accordance with such an exemplary embodiment, horizontal support piece 87 may contain a hole large enough to allow the nutrient solution in reservoir 16 to be refilled.

In accordance with an exemplary embodiment, insert portion 20 is molded from a plastic, such as polyvinyl chloride (PVC). Such an insert portion 20 comprising may be used because of the lightness, strength, and ease of manufacture. However, insert portion 20 may be formed from a variety of materials, e.g. alloys, rubbers, composites and the like, in a large variety of configurations, and using a large variety of methods capable providing support for the plant growth substrate.

Figure 5:
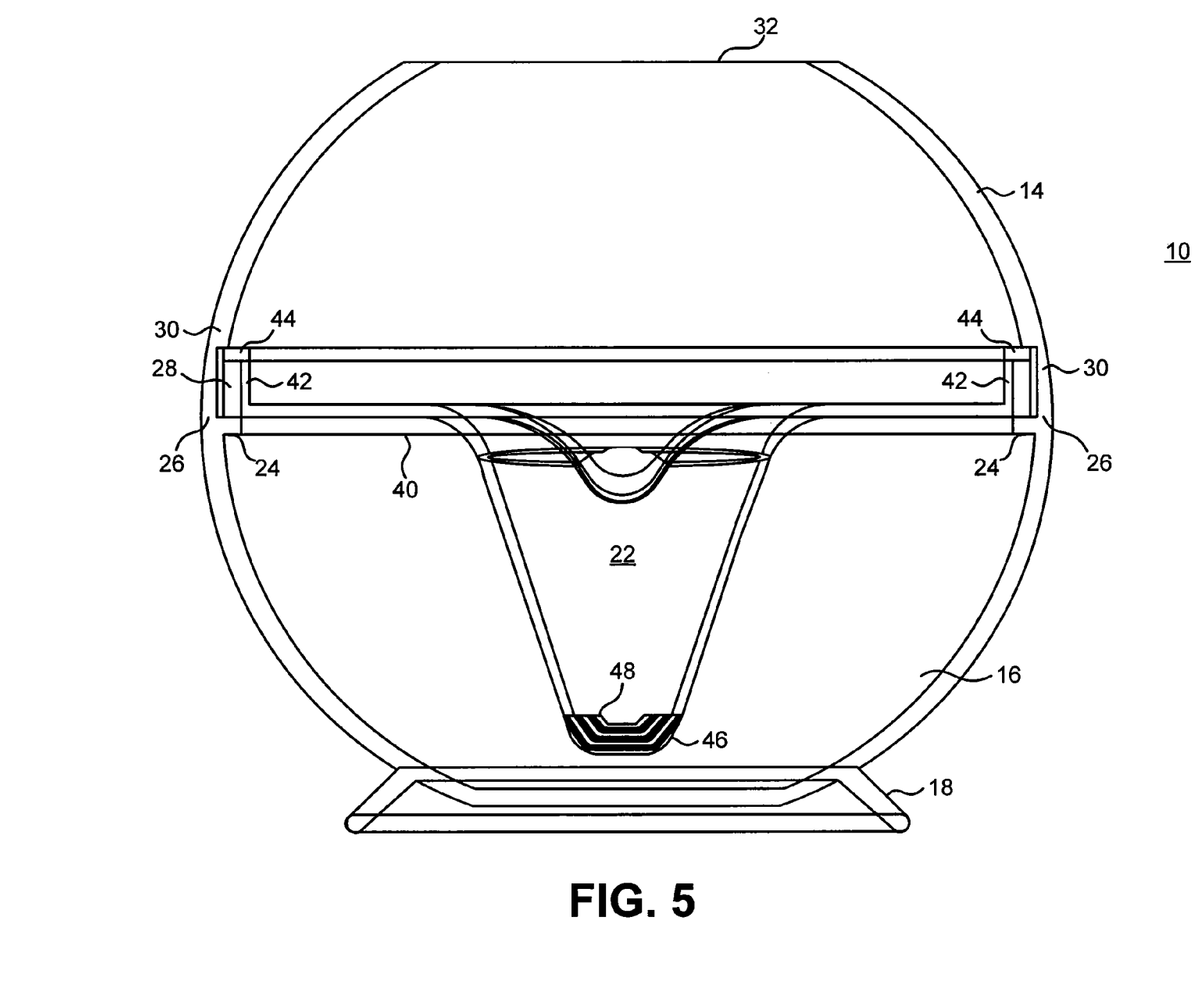
FIG. 5 is a side sectional view of an exemplary embodiment of the present invention showing the base, the cover, and the insert portion having at least one conical depression.
Figure 6:
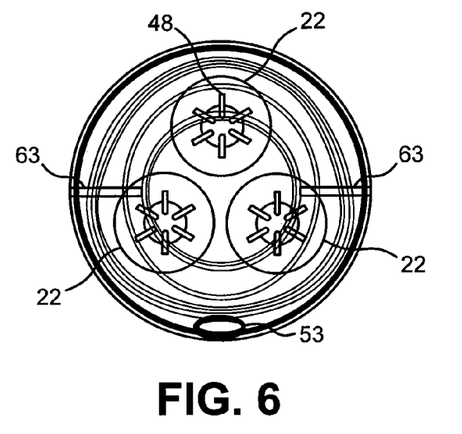
FIG. 6 is a top sectional view of an exemplary embodiment of the present invention having three plant receiving depressions.

As shown in an exemplary embodiment in FIG. 5, an exemplary horizontal support piece 40 of insert portion 20 may comprise a vertically upward stepped portion 42 around its periphery. Stepped portion 42 has an outer diameter slightly smaller than the inner diameter of horizontal wall 28 of base 12 and an outwardly directed flange 44 formed at its upper edge. Thus, when insert portion 20 is placed inside base 12, flange 44 is in supporting engagement with the upper edge of horizontal wall 28. Also, the outer surface of stepped portion 42 is parallel with and adjacent to the inner surface of horizontal wall 28. As can be seen, in this exemplary embodiment, base 12, insert portion 20, and cover 14 fit together in a mutually supporting relationship to facilitate, for example, maximum strength, economy of space, and/or aesthetic appearance.

In accordance with another aspect of the present invention, the capillary hydration system and method are configured to protect or control the impact of the external environment. In accordance with an exemplary embodiment, capillary hydration unit 10 may further comprise a cover 14. Cover 14 is any structure that controls the amount of light and/or air that reaches the interior of the capillary hydration unit. Cover 14 may also function to protect the plant growing inside the capillary hydration unit 10 from other environmental impact.

Figure 3:
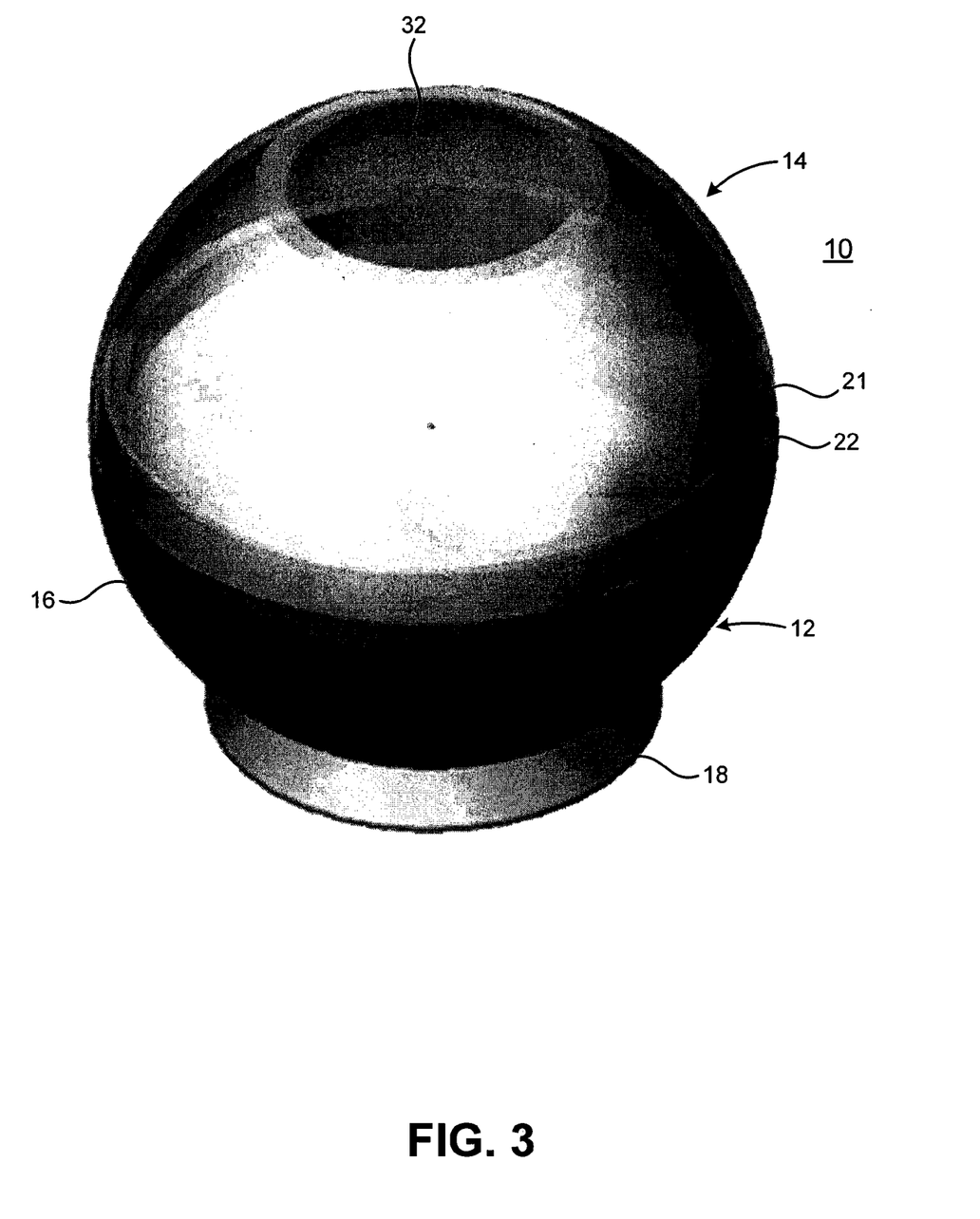
FIG. 3 is perspective view of an exemplary cover coupled to a base in accordance with an exemplary embodiment of the present invention.

As shown in an exemplary embodiment in FIG. 3, cover 14 may be substantially hemispherical. In one exemplary embodiment, cover 14 is coupled with base 12 to form a substantially complete sphere. In accordance with an exemplary embodiment of the present invention, cover 14 is substantially the same shape and/or configuration as base 12, thus permitting the cover 14 to easily mate with or otherwise couple to base 12. For example, cover 14 may be substantially hemispherical such that when it is mated with a substantially hemispherical base 12 the capillary hydration unit is substantially spherical. However, cover 12 may be any shape, such as rectangular, pyramidal, octagonal and the like for providing a covering to base 12. In addition, cover 12 and reservoir 16 may be formed to mate as tightly or as loosely as desired for the specific application.

In one exemplary embodiment, cover 14 is removably screwed onto base 12, with cover 14 and base 12 comprising threaded portions; in other exemplary embodiments, cover 14 and base 12 may comprise snapping or other like pressure-fit coupling arrangements. Furthermore, cover 14 may be configured to couple with base 12 as tightly or as loosely as desired. Accordingly, any configuration or method of removably attaching cover 14 to base 12, such as screwing, snapping, loose-fitting and the like, that is known, or hereinafter devised, may be used.

Referring again to the exemplary embodiment shown in FIG. 3, cover 14 may have an opening 32 proximate its apex to provide light and air and to allow a plant to grow out from the interior of the capillary hydration unit 10. In one exemplary embodiment, opening 32 is sufficiently narrow such that the sides of cover 14 provide support to a plant growing out of capillary hydration unit 10. However, opening 32 may be any size and/or shape that is suitable to provide for air circulation, entry of light, and/or to allow the plant to grow out beyond the confines of the capillary hydration unit. In another exemplary embodiment, cover 14 may have no openings 32 so as to completely restrict the amount of air reaching the interior of capillary hydration unit 10.

In one exemplary embodiment, cover 14 is made of a substantially transparent plastic or glass or other like light-emitting materials so as to permit light to enter. However, cover 14 may be made of any material suitable to control the entry of light and/or air. Furthermore, cover 14 may be any color of material, and/or may be transparent opaque, so as to restrict the amount of light that enters capillary hydration unit 10. In one exemplary embodiment, capillary hydration unit 10 may further comprise a lighting mechanism. In one exemplary embodiment, the lighting mechanism comprises an arm coupled to a lighting portion. The arm may be attached to the base 12 or cover 14 of capillary hydration unit 10 via any known or hereinafter devised attachment mechanism, for example, screws, bolts and the like. The arm may then be adjusted to place the lighting portion in an optimal position to supply light to the plant. As will be appreciated by one skilled in the art, in other non-limiting embodiments, any lighting mechanisms known or hereinafter devised may be used.

In some exemplary embodiments, cover 14 may be interchanged or may be removed at different stages of plant development to facilitate growth. For example, in one embodiment, it may be preferable to use an opaque cover 14 in the early stages of plant growth, and switch to a more transparent cover 14 once the plant begins to develop to permit the entry of more light.

Figure 4:
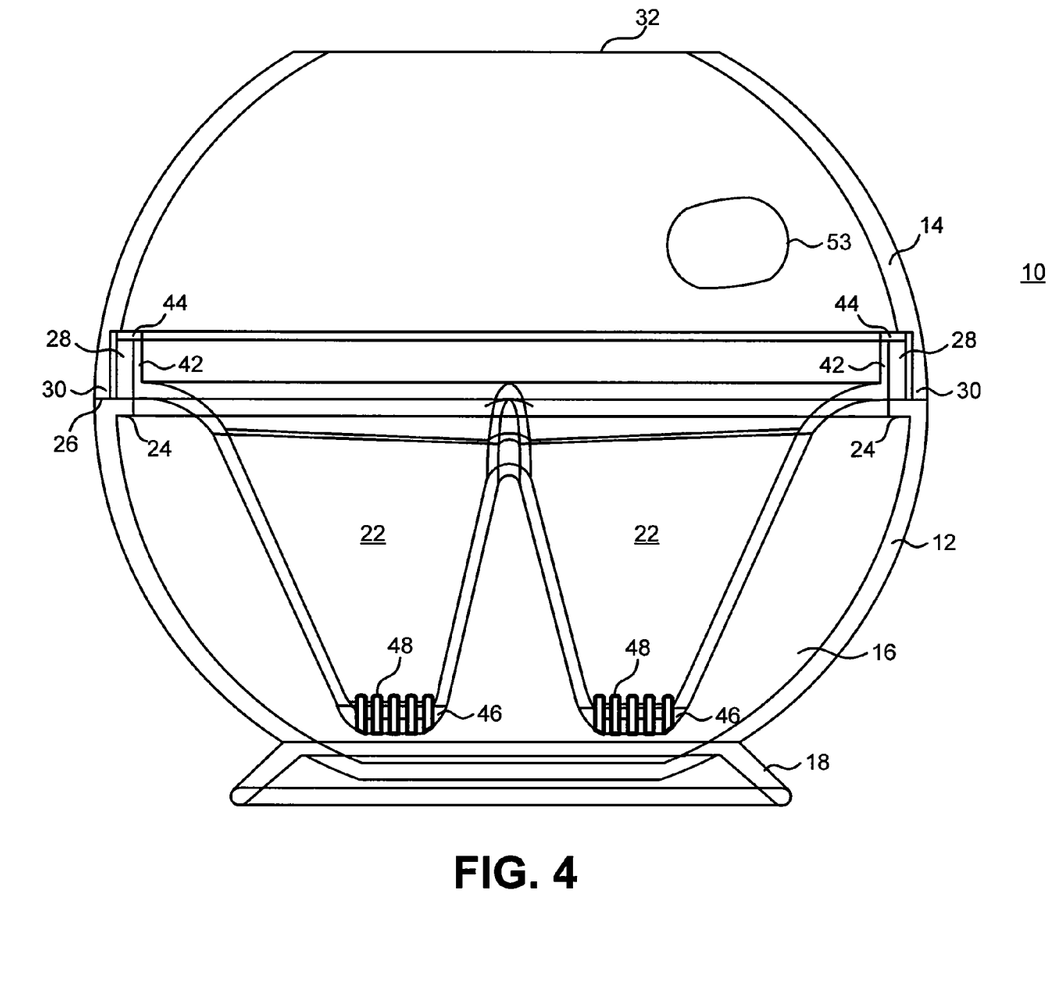
FIG. 4 is a front sectional view of an exemplary embodiment of the present invention showing a base, a cover, and an insert portion having two conical depressions.

FIGS. 4 and 5 further illustrate an exemplary inter-relationship of base 12, insert portion 20 and cover 14. As shown in these exemplary embodiments of FIGS. 4 and 5, a portion 24 of the outer wall of base 12, adjacent the upper edge, is stepped radially inwardly around the periphery to form a horizontal step 26 in the outer surface with a short portion of horizontal wall 28 extending upwardly therefrom. Cover 14 is formed with a flattened portion 30 extending around the inner surface adjacent the lower edge, so that flattened portion 30 is substantially parallel with and in sliding frictional engagement with the outer surface of horizontal wall 28 of reservoir 16. The lower edge of cover 14 is positioned in supporting engagement on horizontal step 26. However, as mentioned above, cover 14 and reservoir 16 can be formed to mate as tightly or as loosely as desired for the specific application.

Figure 8:
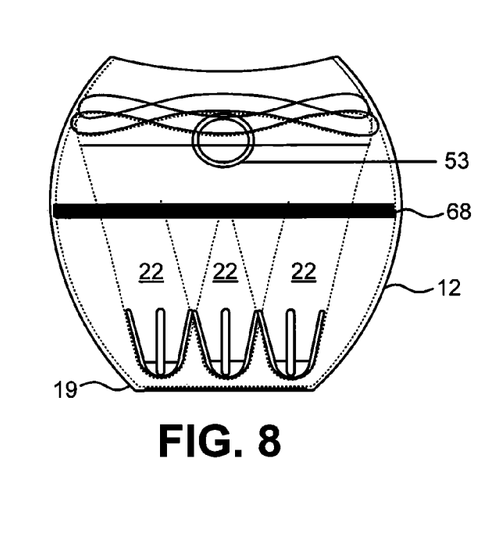
FIG. 8 is a sectional view of an exemplary embodiment of the present invention showing the watertight seal between the base and the cover, and the insert portion having three plant receiving depressions.
Figure 9:
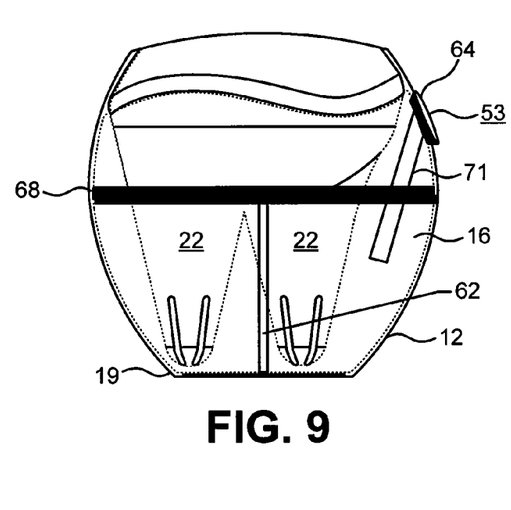
FIG. 9 shows a sectional view of an exemplary embodiment of the present invention showing a nutrient supply hatch and a water level indicator.

In some exemplary embodiments, such as those illustrated in FIGS. 8 and 9, base 12 may have a seal 68 along the periphery of its upper edge to make the capillary hydration unit 10 watertight and/or airtight when cover 14 is attached. In some embodiments, the seal 68 may be made of rubber. However, such a seal may comprise any material capable of preventing the passage of air, light and/or liquid.

In accordance with another aspect of the present invention, a capillary hydration system and method may be configured for allowing the addition of nutrients. For example, in accordance with exemplary embodiment illustrated in FIGS. 7-9, capillary hydration unit 10 may further comprise a nutrient supply hatch 53. Nutrient supply hatch 53 is any structure that acts as a conduit for nutrients, whether in tablet, capsule, liquid or any other form, to be added into reservoir 16 without removal of cover 14 or insert portion 20 and without the disruption of the growth substrate. Thus, nutrient supply hatch 53 can comprise substantially round, rectangular or any other shape openings, of any suitably size, to permit the addition of nutrients.

In accordance with an exemplary embodiment shown in FIG. 9, nutrient supply hatch 22 comprises a lid 64 and chute 71. Preferably, lid 64 is located in cover 14 of capillary hydration unit 10, and is coupled to chute 71 which extends downwardly, either straight down or even preferably at an angle, through the growth substrate and insert portion 20 and into reservoir 16. When lid 64 is removed, nutrients or other materials may be deposited into the reservoir 16 via chute 71 without removing cover 14 and/or insert portion 20. Cover 64 and chute 71 can comprise various shapes, sizes, lengths and configurations for permitting the addition of water and/or nutrients.

In various other exemplary embodiments, capillary hydration unit 10 may further comprise a nutrient supply level indicator. A nutrient supply level indicator is any structure that allows a user to determine the amount of water and/or nutrient contained in an reservoir 16, without removing the insert portion, thereby disrupting the growth substrate. For example, in one exemplary embodiment shown in FIGS. 7 and 9, nutrient supply level indicator 62 comprises a vertically extending transparent strip 63 located in the otherwise opaque surface of base 12, such that the water level in reservoir 16 may be observed through the vertically extending transparent strip 63. However, any structure or method of determining the amount of nutrient solution in the reservoir 16 that is known or hereinafter devised may be used. Thus, for example, when the level of water or liquid nutrient is so low that it is no longer in liquid communication with capillary openings 48, water and/or liquid nutrient may be refilled using by removing lid 64 of nutrient supply hatch 53 and pouring the liquid nutrient down chute 71.

In an exemplary embodiment, reservoir 16 is filled to a convenient level of nutrient solution such that it will not overflow. The insert portion 20 is then removably attached to base 12, such that capillary openings 48 of plant receiving depressions 22 are in liquid communication with the nutrient solution located in the reservoir 16. Plant receiving depressions 22 are filled with plant growth substrate and root clippings from a plant. Cover 14 is then removably attached to base 12. Over time, nutrient solution is wicked up through capillary openings 48 and through the plant growth substrate to the plant. As discussed herein, in one exemplary embodiment, the roots of the plant may grow through capillary openings 48 to be in direct liquid communication with the nutrient solution.

Thus, a new and improved capillary hydration system and method for growing plants has been disclosed. The new and improved capillary hydration unit can be used for growing plants by hydroponics, standard earth methods, or any combination of the two. The new and improved capillary hydration unit is convenient for growing plants in limited space and for growing plants conveniently and with less start-up cost. The new and improved capillary hydration unit is convenient for growing plants in substantially any environment using very little space and requiring only limited maintenance and can be very easily manufactured and used. Because the capillary hydration unit includes a reservoir and because nutrient solution is wicked out of the reservoir slowly by capillary action, the unit can maintain, for example, house plants and the like, for days without requiring attention.

The present invention has been described above with reference to various exemplary embodiments. However, those skilled in the art will recognize that changes and modifications may be made to the exemplary embodiments without departing from the scope of the present invention. For example, the various components and structure, as well as any operational steps, may be implemented in alternate ways depending upon the particular application or in consideration of any number of cost functions associated with the operation of the system, e.g., various of the component and methodologies and/or steps may be deleted, modified, or combined with other components, methodologies and/or steps. These and other functions, methods, changes or modifications are intended to be included within the scope of the present invention, as set forth in the following claims.

I claim:

1. A capillary hydration system for facilitating the growth of plants, the capillary hydration system comprising:
    a base having a reservoir for containing a liquid nutrient; and
    an insert portion including: a horizontal wall having a plant receiving depression integrally formed within the horizontal wall of the insert portion, the plant receiving depression downwardly extending into the reservoir with a lower portion of the plant receiving depression in liquid communication with the liquid nutrient, the plant receiving depression being further operable to contain a plant growth substrate, the plant receiving depression comprising a lower portion having a plurality of capillary openings, the plurality of capillary openings operable to be in liquid communication with the liquid nutrient contained in the reservoir, the plant receiving depression being further operable to physically separate the plant growth substrate from the liquid nutrient contained in the reservoir except by liquid communication through the plurality of capillary openings, the plant receiving depression operable to provide the liquid nutrient to the plant growth substrate through capillary action; a cover operable to mate with the base; a nutrient supply hatch located in the cover, wherein the nutrient supply hatch comprising a lid and a chute, the chute extending downwardly through the insert portion to facilitate delivery of the liquid nutrient directly to the reservoir such that nutrients reach the reservoir without the liquid nutrient contacting the plant growth substrate.

2. A capillary hydration unit as claimed in claim 1 further including a cover positioned over the reservoir and substantially encompassing the insert portion.

3. A capillary hydration unit as claimed in claim 2 wherein the cover has a central opening there through.

4. A capillary hydration unit as claimed in claim 3 wherein the plant receiving depression is substantially cone shaped with a truncated rounded bottom and the plurality of capillary openings are formed in the rounded bottom.

5. A capillary hydration unit as claimed in claim 1, wherein the plurality of capillary openings are longitudinal slits that begin at the bottom of the plant receiving depression and extend along the side of the plant receiving depression to less than a full height of the plant receiving depression.

6. A capillary hydration unit as claimed in claim 2, wherein the base and the reservoir are substantially hemispherical and wherein the base comprises a threaded rim; the base further comprising a nutrient supply level indicator integrated in a wall of the base, the nutrient supply level indicator comprising a vertically extending, substantially transparent strip.

7. A capillary hydration unit as claimed in claim 6, the cover having a substantially hemispherical shape and comprising a threaded rim and such that the cover is operable to mate with the threaded rim of the base and provide a substantially spherical unit.

8. A capillary hydration unit as claimed in claim 7 wherein the insert portion is separate and removable from the reservoir, the insert portion having at least three plant receiving depressions such that when the insert portion is removed from the base, the insert portion can stand upright on the plant receiving depressions and continue to support a plant, while operably containing the plant growth substrate.

9. A capillary hydration unit as claimed in claim 8 wherein the cover comprises a nutrient supply hatch configured to facilitate the addition of nutrients.

10. A capillary hydration unit as claimed in claim 9 wherein the nutrient supply hatch comprises a lid for covering an opening of the nutrient supply hatch, and comprises a chute configured for extending downwardly below the insert portion to facilitate the delivery of the nutrients directly to the reservoir without passing thru the insert portion.

11. A capillary hydration unit as claimed in claim 10 wherein the base comprises a drainage port configured with a stopper to facilitate the selective drainage of nutrient solution from the reservoir.

12. A capillary hydration unit comprising:
    a reservoir for containing a liquid nutrient;
    an insert portion including a horizontal wall with vertical sidewalls forming a plant receiving area and designed to fit in the reservoir, a plurality of plant receiving depressions in the horizontal wall being positioned in the reservoir with a lower portion of the plurality of depressions in liquid communication with the liquid nutrient, each of the plurality of depressions being formed to receive a plant growth substrate; and
    capillary openings in a surface of the lower portion of the plurality of depressions, the capillary openings being in liquid communication with the reservoir and liquid communication with the plurality of depressions, the openings supplying nutrient solution from the reservoir to the depression by capillary action; and
    a cover having a nutrient supply hatch configured to facilitate the addition of nutrients; the nutrient supply hatch comprising a lid and a chute, the chute extending downwardly through the insert portion to facilitate delivery of the liquid nutrient directly to the reservoir such that nutrients reach the reservoir without the liquid nutrient contacting the plant growth substrate.

13. A capillary hydration unit as claimed in claim 12 further including a cover positioned over the reservoir and substantially encompassing the insert portion.

14. A capillary hydration unit as claimed in claim 13 wherein the cover has a central opening configured proximate an apex and configured to allow a plant to grow through and having sides to support growth of the plant.

15. A capillary hydration unit as claimed in claim 14 wherein the cover comprises an opaque material configured to limit an amount of light passing through.

16. A capillary hydration unit as claimed in claim 12 wherein the plurality of depressions are integrally formed within the horizontal wall of the insert portion, the plurality of depressions downwardly extending into the reservoir, the plurality of depressions being further operable to contain a plant growth substrate, the plurality of plant receiving depressions are configured to physically separate the plant growth substrate from the nutrient solution contained in the reservoir except by supply through the capillary openings and the plurality of plant receiving depressions are substantially cone shaped with a truncated rounded bottom and the capillary openings are formed in the rounded bottom and wherein the capillary openings are longitudinal slits.

17. A capillary hydration unit as claimed in claim 11 wherein the reservoir comprises an integrated nutrient supply level indicator comprising a vertically extending substantially transparent strip located on a wall of the reservoir below the horizontal wall of the insert portion.

18. A capillary hydration system comprising:
    a reservoir for containing a nutrient solution having an upper edge;
    an insert portion being removably insertable into the reservoir; the insert portion having a plurality of integrally formed plant receiving depressions extending downwardly from the insert portion, at least a portion of the plant receiving depressions being immersed in the nutrient solution, the plant receiving depressions being further operable to contain a plant growth substrate, each of the plurality of depressions having at least one capillary opening in an outer surface, wherein the at least one capillary opening is immersed in the nutrient solution in the reservoir, wherein the at least one capillary opening is capable of supplying the nutrient solution by capillary action from the reservoir to the plant growth substrate contained in the plant receiving depression, wherein the insert portion is configured to physically separate the plant growth substrate from the nutrient solution contained in the reservoir except by supply through the capillary openings into the plurality of depressions; and a removably attachable cover comprising a nutrient supply hatch operable to facilitate the addition of nutrient solution directly to the reservoir; the nutrient supply hatch comprises a lid and a chute, wherein the chute extending downwardly through the insert portion to facilitate delivery of the liquid nutrient directly to the reservoir such that nutrients reach the reservoir without the liquid nutrient contacting the plant growth substrate.

* * * * *